(12) United States Patent
Nguyen et al.

(10) Patent No.: US 12,225,293 B2
(45) Date of Patent: Feb. 11, 2025

(54) PHENOTYPING DEVICE, METHOD AND SYSTEM FOR MEASURING PHENOTYPIC TRAITS OF ONE OR MORE PLANTS IN A TARGET CANOPY

(71) Applicant: Yield Systems Oy, Helsinki (FI)

(72) Inventors: Linh Nguyen, Espoo (FI); Simo Seppälä, Helsinki (FI); Paul Wagner, Espoo (FI); Harri Juntunen, Helsinki (FI); Jussi Gillberg, Helsinki (FI)

(73) Assignee: Yield System Oy, Helsinki (FI)

( * ) Notice: Subject to any disclaimer, the term of this patent is extended or adjusted under 35 U.S.C. 154(b) by 108 days.

(21) Appl. No.: 17/801,576

(22) PCT Filed: Feb. 19, 2021

(86) PCT No.: PCT/EP2021/054147
§ 371 (c)(1),
(2) Date: Aug. 23, 2022

(87) PCT Pub. No.: WO2021/170498
PCT Pub. Date: Sep. 2, 2021

(65) Prior Publication Data
US 2023/0132136 A1 Apr. 27, 2023

(30) Foreign Application Priority Data
Feb. 28, 2020 (FI) .................................. 20205209

(51) Int. Cl.
*H04N 23/695* (2023.01)
*A01G 7/00* (2006.01)

(52) U.S. Cl.
CPC ............ *H04N 23/695* (2023.01); *A01G 7/00* (2013.01)

(58) Field of Classification Search
CPC .............................. H04N 23/695; A01G 7/00
See application file for complete search history.

(56) References Cited

U.S. PATENT DOCUMENTS

| | | |
|---|---|---|
| 2019/0191631 A1 | 6/2019 | Regan et al. |
| 2019/0274241 A1 | 9/2019 | Tippery et al. |
| 2022/0050093 A1* | 2/2022 | Scheiner ............ G01N 33/0098 |

FOREIGN PATENT DOCUMENTS

CN          105547152 A      5/2016

OTHER PUBLICATIONS

Finnish Patent and Registration Office, Search Report, Application No. 20205209, mailed Sep. 11, 2020, 1 page.

(Continued)

*Primary Examiner* — Kathleen V Nguyen
(74) *Attorney, Agent, or Firm* — Ziegler IP Law Group, LLC.

(57) ABSTRACT

A phenotyping device, method and system for measuring phenotypic traits of one or more plants in a target canopy, wherein the includes a canopy spreader for spreading the target canopy, a camera unit, a means for controlling the angle and the distance of the camera unit in relation to the canopy spreader, an electronic control unit for controlling the camera unit. The phenotyping device, method and system enables recording the raw data from the target canopy during a data collection session including information of the plants that are not visible to a camera unit without spreading the canopy.

16 Claims, 6 Drawing Sheets

(56) References Cited

OTHER PUBLICATIONS

International Preliminary Report on Patentability, European Patent Office, Application No. PCT/EP2021/054147, mailed Feb. 1, 2022, 16 pages.
International Search Report and Written Opinion, European Patent Office, Application No. PCT/EP2021/0554147, mailed Jun. 18, 2021, 12 pages.
Yang et al., "Crop Phenomics and High-Throughput Phenotyping: Past Decades, Current Challenges, and Future Perspectives", CellPress Partner Journal, Molecular Plant, vol. 13, No. 2 Feb. 1, 2020, XP055795491, ISSN: 1674-2052, DOI: 10.1016/j.molp.2020.01.008, 28 pages.

\* cited by examiner

PHENOTYPING DEVICE, METHOD AND SYSTEM FOR MEASURING PHENOTYPIC TRAITS OF ONE OR MORE PLANTS IN A TARGET CANOPY

TECHNICAL FIELD

The present disclosure relates generally to digital phenotyping systems and methods, more specifically to measuring plant traits. Moreover, the present disclosure relates to devices and methods digital image processing.

BACKGROUND

Digital phenotyping refers to estimating plant traits from image data. Digital phenotyping is used in plant breeding to produce data in a cost-efficient manner. In crop production, imaging-based methods for assessing crop health and productivity are used for optimising agronomic management, for example selecting areas of field parcels that will be treated with herbicides and selecting the amounts of fertilisers used.

Existing devices and methods for digital phenotyping analyse image data taken from the above the canopy, whereas many agronomically relevant traits are located well below the top of the canopy. The problem is that the cameras of the known devices only see upper parts of the canopy and therefore the collected images do not provide relevant and accurate information about the phenotypic traits below the top of the canopy.

Estimates of plant phenotypic traits are needed as the basis of decision making in crop production and crop production R&D. The estimates of plant phenotypic traits are used e.g., for decision making and optimisation. Information about plants measured in the form of plant phenotypic trait estimates is the cornerstone for assessing the relative performance of different plant genotypes (varieties or variety candidates in a breeding program), agronomic practices and e.g., the effectiveness of and risks related to agronomic inputs such as fertilisers, herbicides and pesticides.

Therefore, in light of the foregoing discussion, there exists a need to overcome the drawbacks associated with conventional devices and methods used for digital phenotyping.

SUMMARY

The aim of the present disclosure is to improve the relevance and accuracy of the image data produced in terms of the phenotypic traits not visible from the above. The aim of the disclosure is achieved by a phenotypic device and method which enable to spread mechanically the canopy and to obtain image data from the parts below the top thus improve the relevance and accuracy of the image data produced in terms of the phenotypic traits not visible from the above.

In one aspect, an embodiment of the present disclosure provides a phenotyping device for measuring phenotypic traits of one or more plants in a target canopy comprises one or more canopy spreaders for revealing the one or more plants for imaging in the target canopy; one or more camera units; a means for controlling the angle and the distance of the one or more camera units in relation to the one or more canopy spreaders; an electronic control unit for controlling the camera unit.

In another aspect, an embodiment of the present disclosure provides a phenotyping method for measuring phenotypic traits of one or more plants in a target canopy, the method comprises steps of defining an input data specification for a raw data collected by one or more camera units of a phenotyping device from a current set of raw data collection targets; defining a use-orientation-height specification; defining a device-specific device-location-angle specification; defining a use movement specification; adjusting at least one parameter of a means for controlling an angle and a distance of the one or more camera units in relation to a canopy spreader according to the device-specific device-location-angle specification; initiating the raw data collection session; moving a phenotyping device partly in contact with the one or more plants in the target canopy according to the defined use-orientation-height specification and according to the use movement specification for revealing the one or more plants for imaging in measuring phenotypic traits of the one or more plants; recording the raw data of the one or more plants in the target canopy while moving the device partly in contact with the target canopy according to the use-orientation-height specification and according to the defined use movement specification; processing the recorded raw data to estimate the phenotypic traits of the one or more plants in the target canopy.

In another aspect, an embodiment of the present disclosure provides a phenotyping system for measuring phenotypic traits of one or more plants in a target canopy comprising at least one phenotyping device according to present disclosure; a means for moving the phenotyping device; and a means for processing the data produced by a phenotyping method comprising one or more computational units.

The phenotyping device, method and system according to the present disclosure enable to spread the plants of the target canopy to reveal parts of the plants belonging to the raw data collection targets in the target canopy that would not be visible without spreading the canopy. This improves the quality and number of phenotypic trait estimates obtained by processing video from a canopy by attaching a mechanical structure to a moving video camera so that when the camera moves, the mechanical structure (i.e., the canopy spreader) reveals new parts of the canopy to the video camera.

BRIEF DESCRIPTION OF THE DRAWINGS

Embodiments of the present disclosure will now be described, by way of example only, with reference to the following diagrams wherein.

DETAILED DESCRIPTION OF EMBODIMENTS

Figure 1:
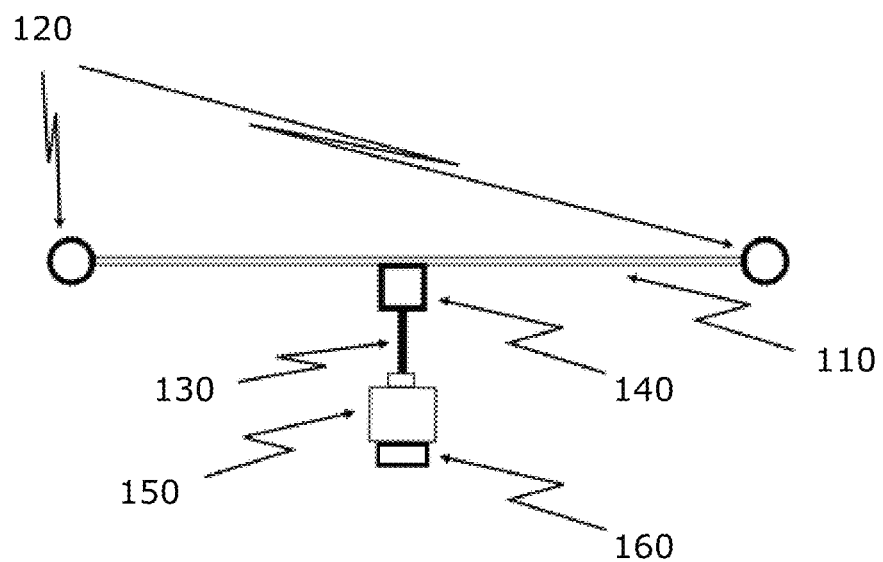
FIG. 1 is a schematic top view of a phenotyping device according to an embodiment illustrating the phenotyping device comprising two height sensors and a tension sensor.

The following detailed description illustrates embodiments of the present disclosure and ways in which they can be implemented. The present disclosure provides the phenotyping device, method and system for measuring phenotypic traits of one or more plants in a target canopy.

In one aspect, an embodiment of the present disclosure provides a phenotyping device for measuring phenotypic traits of one or more plants in a target canopy, the device comprises one or more canopy spreaders for revealing the one or more plants for imaging in the target canopy; one or more camera units; a means for controlling the angle and the distance of the one or more camera units in relation to the one or more canopy spreaders; an electronic control unit for controlling the camera unit.

In alternative embodiments the phenotyping device for measuring phenotypic traits of one or more plants in a target canopy comprises at least one of a storage component, on which a raw data recorded by the one or more camera units is stored; a power source for providing electricity to electronic components that need power; one or more tension sensors to measure the mechanical strain related to spreading the canopy with the one or more canopy spreaders, wherein the one or more tension sensors being connected to the one or more canopy spreaders; one or more height sensors connected to the storage component and mechanically connected to the phenotyping device; other sensors connected to the storage component, wherein the measurements recorded by the other sensors being included in the raw data stored on the storage component and mechanically connected to the phenotyping device; one or more control units for activating and deactivating the data collection session and in other ways controlling the one or more camera units; one or more cooling units connected to the electronic components that need cooling; a solar panel power unit that is connected to the power source and to recharge the power source; one or more mechanical support structures that are mechanically connected to the phenotyping device; one or more computational units; means for moving the phenotyping device (e.g., a robotic system or vehicle); a mechanization unit.

In one aspect, an embodiment of the present disclosure provides a phenotyping device for measuring phenotypic traits of one or more plants in a target canopy comprises: a frame; a canopy spreader attached to the frame for spreading one or more plants of the target canopy; a camera position maintenance unit connected to the frame; a camera unit connected to the camera position maintenance unit; an electronic control unit, wherein the frame maintains the angle and distance between the canopy spreader and the camera position maintenance unit fixed while the device is moving partly in contact with the plants of the target canopy.

Throughout the present disclosure, the term "phenotypic traits" refers to the measurements, estimates and counts related to the structure and growth of plants in a canopy. The phenotypic traits comprise the structure, number, species, variety, density and location of the plants in the canopy. Furthermore, the phenotypic traits comprise the size and number of subparts of the plants such as yield components and leaves of the plants in the canopy and mechanical and spectral properties of the plants and the canopy. Furthermore, phenotypic traits further comprise statistics such as mean, variance and quantiles, estimated distributions and spatial distributions of the other phenotypic traits. Furthermore, the phenotypic traits comprise time series of the estimates, counts and statistics related to the plants in the canopy. Phenotypic traits also comprise agronomic outcomes such as yield and disease tolerance or susceptibility.

The term "target canopy" relates to a piece of land covered with plants, the physical structure of the plants being of interest. In an example, the target canopy is a trial plot used in plant breeding. In another example the target canopy may be a canopy that grows in a growth chamber or in a greenhouse. In yet another example, the target canopy is for example a subpart of a field parcel used for agronomic production. The species of the plants growing in the target canopy may vary from grasses to cereals, pulses, crops or any other kind of plant species.

Throughout the disclosure, the term "spreading the canopy" refers to pushing or pulling plants of the canopy belonging to a set A so that parts of the plants in another set B and optionally parts of the plants in set A are revealed for imaging.

The phrase "moving the device partly in contact with the target canopy" refers to the canopy spreader manipulating the position of one or more plants in the target canopy that are not a part of the current set of raw data collection targets to improve the visibility of the plants in the current set of raw data collection targets to the one or more camera units. In other words, the device is in contact with parts of the target canopy.

The canopy spreader or in alternative embodiments optionally more than one canopy spreaders of the present phenotyping device creates an opening in the canopy by spreading the canopy so that plant parts below the top of the canopy of a current set of raw data collection targets are made visible to the one or more camera units and optionally the set of other sensors. The canopy spreader may comprise one of the following but not limited to: a stick or a shaft that pushes or pulls away other plants that are blocking the visibility from the camera unit to the current imaging target plants, wherein the width of the canopy spreader depends on the width of the target canopy. Optionally, only a smaller part of the target canopy is of interest, such as 30% of the width of a breeding plot in the middle of the breeding plot and the canopy spreader is only wide-enough to only cover the smaller part of interest.

In an example, the phenotyping device comprises two canopy spreaders that are 140 cm long shafts attached parallel to each other 10 cm-40 cm apart from each other. In another example, the phenotyping device comprises one canopy spreader that is a 150 cm long shaft. In a third example the canopy spreader is a shaft that contains plow-like structures that separate plants in different planting rows. Optionally, the width of the canopy spreader is adjustable e.g., between 95 cm and 180 cm. The width of the one or more canopy spreaders can thus be from 95, 105, 115, 125, 135, 145, 155, 165 or 175 cm up to 100, 110, 120, 130, 140, 150, 160, 170 or 178 cm. Having several narrow canopy spreaders or one more wide canopy spreader has the surprising effect of greatly improving visibility to the current set of raw data collection targets. If the device has only one narrow spreader, the plants pushed aside by the canopy spreader will not remain behind during the operation of the device and will rise to block the camera visibility to the current set of raw data collection targets.

In an example, the means for controlling the angle and the distance of the camera unit comprises an adjustable frame comprising a camera position maintenance unit and the canopy spreader is attached to the adjustable frame by an adjustable connector that enables adjusting the angle at which the canopy spreader is attached to the adjustable frame. Modifying the angle may be necessary to obtain better visibility from the camera unit to the current set of raw data collection targets.

The camera unit may comprise one or more cameras. Additionally, in alternative embodiments the camera unit may further comprise a power element, a flash or light source, spectral sensors, laser scanners, Lidar sensors or other distance measurement sensors or additional means. The camera unit takes still images or records videos constantly during the measuring process to collect raw data from the current set of raw data collection targets. The camera unit may record bandwidths visible or invisible to the human eye. The camera unit may also comprise other spectral sensors. The camera unit may comprise laser scanners and Lidar sensors and other distance measurement sensors. The camera unit may comprise of several cameras or other sensors. One benefit of having several cameras is that it enables stereo imaging. The camera unit is electronically connected to a power source to provide power to the camera unit. The camera unit is connected in terms of data transfer to a storage unit and the still images and videos are stored on the storage unit. Optionally, the camera unit comprises several camera units. Thus, in the embodiments of the present disclosure a camera unit of the one or more camera units comprises at least one of one or more cameras, one or more spectral sensors, a laser scanner or a Lidar sensors.

A means for controlling the angle and the distance of the camera unit in relation to the canopy spreader enable the control of the distance and angle between the canopy spreader and the camera unit according to a device-specific device-location-angle specification with the outcome that an input data specification is fulfilled by the raw data collected by the camera unit from the current set of raw data collection targets. The means for controlling the angle and the distance of the camera unit in relation to the canopy spreader maintains the position and orientation of the one or more camera units fixed relative to the canopy spreader so that the camera unit has visibility to a current set raw data collection targets when the canopy spreader is spreading the target canopy according to the use-orientation-height specification and optionally moved at the velocity specified by a use movement specification.

Optionally, the dimensions and angles of the means for controlling the angle and the distance of the camera unit in relation to the canopy spreader are adjustable to enable adjusting the angle and distance at which the camera unit is located with respect to the canopy spreader according to different device-specific device-location-angle specifications. Adjusting the angle and distance parameters at which the camera unit is connected to the canopy spreader has the benefit of improving the quality of the recorded raw data.

In an example the means for controlling the angle and the distance of the camera unit in relation to the canopy spreader comprises an adjustable frame that is connected to the canopy spreader, wherein the adjustable frame has a camera position maintenance unit that is e.g., an adjustable hinge connector that connects the camera unit and the adjustable frame, in which connector the angle of the hinge may be adjusted according to the device-specific device-location-angle specification.

In an example, the adjustable frame comprises two telescopic adjustable structures. The adjustable structures can be e.g. adjustable shafts, where the shorter telescopic shaft ranges between 30 cm to 55 cm in length and the longer telescopic shaft ranges from 50 cm to 150 cm in length, and the two telescopic shafts are connected to each other with a fixed angular connector of 90 degrees and the adjustable frame further comprises a camera position maintenance unit that connects the end of the longer telescopic shaft opposite to the 90 degrees fixed angular connector to the camera unit. In the example the camera position maintenance unit is attached to the camera unit and enables controlling the angle between the camera unit and the longer telescopic shaft between 0 to 340 degrees in the plane defined by the directions of the two telescopic shafts and the angle between the camera unit and the adjustable frame is defined as the angle between the direction of the longer telescopic shaft and a line A from the center of a lens of the camera unit to the center of the image taken by the camera unit. Adjusting the dimensions of the telescopic shafts and the angle between the camera unit and the longer telescopic shaft enables obtaining high quality images and video in different use environments, where for example the heights of the canopy and plot widths of breeding plots are different. In an example, higher quality is obtained by optimising the orientation of the camera so that the projection of the relevant parts of the plants in the current set of raw data collection targets are captured in as many pixels as possible at each time point in the image or video captured by the camera unit.

In an example, in a first location A the plants of the canopy are stiff and only a small opening can be made with the canopy spreader and thus the camera unit must record raw data from a high position resulting in low resolution. In a second location B the plants of the canopy are elastic and a wider opening may be made to the canopy with the canopy spreader allowing for the camera unit to record raw data from a lower position with a higher resolution of the raw data.

In another example, the camera position maintenance unit is e.g., a threaded hole in the adjustable frame that enables attaching the camera unit to the adjustable frame with a screw. In yet another example the camera position maintenance unit is e.g., a hole acting as a mount in the adjustable frame into which the camera unit may be pressed into.

Fulfilling the input data specification for the raw data collected by the one or more camera units may require adjusting the angle at which the camera unit is attached to the adjustable frame and therefore the ability to adjust the angle and distance between the camera unit and the canopy spreader is useful if the phenotyping device is used in several different environments with varying types of crops grown and varying trial practices.

In an embodiment, the distance between the camera unit and the canopy spreader is fixed and cannot be adjusted, i.e., in such embodiment, when the distance is fixed, there is no need to adjust the angle and distance between the camera unit. In the embodiment, the advantage is that the angle and distance of the camera unit is the same for all raw data that is collected with the phenotyping device. In the embodiment, the resolution obtained in different environments will vary but with a very good camera unit the obtained resolution may be sufficient for many purposes.

In another example the means for controlling the angle and the distance of the camera unit in relation to the canopy spreader is a drone to which the camera unit and optionally some of the sensors in the set of other sensors are attached to. The drone is programmed to fly and maintain the fixed position and orientation relative to the canopy spreader specified by the device-specific device-location-angle specification.

In another example, the means for controlling the angle and the distance of a camera unit in relation to a canopy spreader comprises means for moving the camera operated by another user according to a protocol which keeps the position and orientation of the camera unit and optionally some of the sensors in the set of other sensors fixed relative to the canopy spreader.

In another example the means for controlling the angle and the distance of the camera unit in relation to the canopy spreader enables adjusting the distance between the camera and the canopy spreader in the orthogonal x, y and z directions and also controlling the angle at which the camera unit records raw data from the current set of raw data collection targets.

In the embodiments of the present disclosure the one or more canopy spreaders may be in fixed position in relation to the position of the one or more camera units. Attaching one or more canopy spreaders to a fixed position in relation to the position of the one or more camera units has the technical effect dramatically improving the visibility of the one or more camera units to the plants of the target canopy when the device is moved in the target canopy. Instead of the one or more camera units obtaining images or video from the top part of the canopy, the full height of the canopy will be revealed when traversing the target canopy for a small part of the canopy at a time, corresponding to the current set of raw data collection targets. The canopy spreader transforms movement of the device into improved visibility to improve the value of the raw data collected by the one or more camera units.

In alternative embodiments the phenotyping device comprises additional sensors, e.g., one or more tension sensors, one or more height sensors. The phenotyping device may comprise also at least one of a microphone for recording voice, wherein a voice control means is used to control the phenotyping device, an acceleration sensor, an orientation sensor, a GPS receivers or any other sensors that can be used to gather the data from the target canopy, wherein the gathered data is stored in a storage component as raw data.

In an embodiment, the one or more tension sensors is for measuring the mechanical resistance related to spreading the canopy with the one or more canopy spreaders. In an example, the canopy spreader is attached to the adjustable frame with a mechanical hinge and the tension of the mechanical hinge resulting from spreading the canopy with the canopy spreader is measured by the tension sensor and recorded on the storage component when moving the phenotyping device in the canopy. In another example, the tension sensor is a mechanical string-based sensor measuring the tension on a hinge connecting the canopy spreader to the adjustable frame, the output of the string-based sensor being recorded as the video input of the camera unit. Optionally, the tension sensor is for connecting the canopy spreader to the means for controlling the angle and the distance of a camera unit in relation to a canopy spreader. In another embodiment the one or more height sensors are attached to the canopy spreader to measure the distance from the canopy spreader to the ground. In an example, two height sensors are attached to the ends of e.g., a 140 cm long shaft-like canopy spreader and pointing towards the ground parallel to the normal of the approximate tangential plane of the ground when the phenotyping device is oriented according to the use-orientation-height-specification. In the example the phenotyping device is used to record raw data from rectangular breeding trial plots that are approximately 120 cm wide, 300 cm long and have 30 cm distance between them in parallel to the width direction. When the phenotyping device is moved parallel to an approximate tangential plane of the ground at height of 20 cm below the approximate tangential plane of the ground so that the shaft-like canopy spreader is aligned parallel to the width direction of the trial plot and the centre of the shaft is in the middle of the trial plot in the width direction, the ends of the canopy spreader are moved in the area separating the trial plots, where in the separating area plants are not tested and vegetation is less high. In this example the height sensors located in the ends of the canopy spreader shaft, the height sensors pointing towards the ground have direct visibility towards the ground and enable to estimate the distance from the canopy spreader to the ground at a resolution of +/−5 cm.

The storage component stores a raw data recorded by the one or more camera units, recorded by one or more tension sensors, received from the set of other sensors or received from one or more height sensors during data collection session.

In an example, the storage component comprises of a network connection that is used to transfer the raw data to a server storage component via the Internet. In another example, the storage component comprises a temporary storage on which the raw data is stored temporarily during the data collection session, and from which the temporarily stored data is transferred to a server storage component after the data collection session via a network connection or the Internet. Optionally, the power source, the camera unit and the storage component are connected to each other via one or more electronic connector units which transfer electricity or data or both electricity and data. Optionally, in an embodiment e.g., a smartphone is used to provide the camera unit, the power source, the storage unit and the electronic control unit.

In an embodiment, the phenotyping device is moved by a robotic system that controls the camera unit via the electronic control unit comprising wired or wireless connections to the main robotic system.

In another example, the electronic control unit is connected directly to the camera unit with a wired or wireless connection. In another example, the electronic control unit is connected to the electronic connector unit. In an embodiment, the electronic control unit initiates and ends video recording by the camera unit while the output of the different sensors is recorded continuously in addition to the time of recording the sensor input. In this embodiment, the recorded output of different sensors can be matched with the recorded videos later based on the time of recording the video or the sensor input.

The power source comprises one or more rechargeable or single-use batteries or the like that is used for providing energy for a subset of electronic components that need power of the phenotyping device. Optionally, a solar power unit is used to provide power to the power source. In an embodiment, the power source comprises two batteries and the solar power unit charges one battery while the other is used to provide power for other electric components of the phenotyping device.

Optionally, one or more cooling units are used to reduce the temperature of the electrical components by transferring away heat from them and reflecting away radiation such as sunlight. In an example, the cooling units use pre-cooled ice bricks attached to the camera unit and the power sources. In another example, the cooling units use thermoelectric cooling techniques to reduce the temperature of one or more electronic components of the phenotyping device.

The one or more height sensors, the one or more tension sensors and the set of other sensors are connected in the phenotyping device at locations where they are capable of measuring their target measurement.

Optionally, the phenotyping device comprises one or more computational units, in which the computation for a first, optionally second and optionally third machine learning systems is performed to process the raw data stored on the storage component. In an embodiment, the computational unit is a smartphone which hosts the first machine learning system. In another embodiment the phenotyping device comprises a computational unit further comprising a CPU and a GPU and other components required for performing computation needed to host the first machine learning system and process the raw data stored on the storage unit.

Optionally, the phenotyping device comprises one or more mechanical support structures which enable moving the phenotyping device by a human user or by a robot or by a vehicle by e.g., transferring the weight of the camera unit onto the mechanical support structures supported by the user. In an embodiment, the mechanical support structures are attached to the adjustable frame to which the canopy spreader and the camera unit are attached to. In another embodiment, the mechanical support structures are attached to the canopy spreader. When the user carries the phenotyping device by the shaft the other components move along. The mechanical support structures may comprise handles to improve ergonomic.

In the embodiment wherein the mechanical support structures comprise handles the mechanical support structures are e.g., two bent shafts. In such embodiment the phenotyping device comprises a frame having one or more canopy spreaders, a camera unit attached to the frame. The mechanical support structure comprising two bent shafts and the handles is connected to the frame with a first double axis connection. The mechanical support structure is also connected to a person carrying the device with a second double axis connection. As long as the person walks in upright position, the double axis connections will ensure that the device remains perpendicular to the ground. The double axis connection can e.g., be connected to a body plate that is fixed to the body with straps. The frame comprises a canopy spreader holding shaft, a camera unit holding shaft connected perpendicular to the canopy spreader holding shaft, a plurality of connecting rods for connecting the shafts of the mechanical support structure canopy spreader holding shaft and camera unit holding shaft, and a counterweight to balance the momentum arising from the mass of the one or more canopy spreaders, the camera unit and the frame to improve ergonomy for the person carrying the device. The one or more canopy spreaders are attached to the canopy spreader holding shaft parallel to each other apart from each other.

Optionally, the phenotyping device is connected to an ergonomics support unit that reduces the burden to the user. In an embodiment, the ergonomics support unit is attached to the adjustable frame of the phenotyping device. In an example, the ergonomics support unit comprises a backpack unit further comprising backpack-like shoulder straps connected to a rigid backpack frame. The rigid backpack frame is then connected to a first pole pointing towards the sky parallel to the normal direction of the approximate tangential plane of the ground when a user is carrying the device oriented. A second pole is connected to the first pole via a hinge connected 30 cm from end A of the second pole and the hinge is connected to the end of the first pole pointing towards the sky. A strong rubber band is then connected to the rigid backpack frame and end A of the second pole. A string is connected to the end B of the second pole and to the backpack frame. By adjusting the length of the string connecting the phenotyping device to the second pole, the length of the second pole and the length of the rubber band, the rubber band will pull the end A of the second shaft towards the backpack inducing a momentum via the hinge connector that will rotate end B of the second shaft towards the sky. In this way, the user needs less strength to maintain the height of the phenotyping device as the weight of the phenotyping device is transferred via the poles to the rigid backpack frame and the shoulder straps and on the shoulders of the person carrying the ergonomics support unit, respectively.

In another embodiment the phenotyping device further comprises a mechanisation unit to control the height of the canopy spreader (i.e., distance to ground) when the phenotyping device is moved in the target canopy. The mechanisation unit may be connected to the canopy spreader, or to the means for controlling the angle and the distance of a camera unit in relation to a canopy spreader or to the mechanical support structure. The mechanisation unit comprises a motorised height controller and optionally a secondary camera unit. The mechanisation unit uses as input one of or both the raw data the output of the secondary camera unit to estimate the height of the canopy. Then the mechanisation unit controls the height of the canopy spreader with the motorised height controller according to a height specification and the estimated height of the canopy. The mechanisation unit optionally comprises other sensors that provide input for estimating the height of the canopy.

In an example, the height specification is to maintain the contact point between the canopy spreader and plants of the target canopy at a specified height, e.g., 20 cm below the top of highest plants in the target canopy.

In another example, the height specification is to maintain the contact between the canopy spreader and the plants of the target canopy at 20 cm below the height 95th percentile of plants of the target canopy. In a third example the height specification is to maintain the canopy spreader at 60 cm height measured from the ground. In another example the height specification is to maintain contact between the canopy spreader and the plants the canopy spreader touches at each moment at 70% of the height of the plants that the canopy spreader touches.

Optionally, the mechanisation unit comprises an automation computational unit comprising of micro controllers or other devices capable of computation based on the input from one or both of the secondary camera unit and the raw data and outputs a control sequence for the motorised height controller that adjusts the height of the canopy spreader to the height specification. The motorised height controller is motorised by stepper motors, servo motors, pneumatic or hydraulic systems. Optionally, the mechanisation unit only uses a subset of the measurements of raw data.

The subset of electronic components that need power comprises of one or more of the one or more camera units, the storage component and optionally the one or more cooling units, the computation unit, the electronic control units and the one or more computation units, the set of other sensors, the one or more height sensors and the one or more tension sensors. The subset of electronic components that need cooling comprises of the subset of electronic components whose performance may suffer in hot conditions and require cooling to enable reliable use in hot summer conditions.

In another aspect, an embodiment of the present disclosure provides a phenotyping method for measuring phenotypic traits of one or more plants in a target canopy, the method comprises steps of defining an input data specification for a raw data collected by one or more camera units of a phenotyping device from a current set of raw data collection targets; defining a use-orientation-height specification; defining a device-specific device-location-angle specification; defining a use movement specification; adjusting at least one parameter of a means for controlling an angle and a distance of the one or more camera units in relation to a canopy spreader according to the device-specific device-location-angle specification; initiating the raw data collection session; moving a phenotyping device partly in contact with the plants in the target canopy according to the defined use-orientation-height specification and according to the use movement specification for revealing the one or more plants for imaging in measuring phenotypic traits of the one or more plants; recording the raw data of the one or more plants in the target canopy while moving the device in contact with the target canopy according to the use-orientation-height specification and according to the defined use movement specification; processing the recorded raw data to estimate the phenotypic traits of the one or more plants in the target canopy.

By defining the use-orientation-height specification it is defined the orientation and height with respect to the canopy, at which orientation and height the phenotyping device is used and the direction of movement with respect to the canopy. In an embodiment, the height parameter of the use-orientation-height specification is defined relative to the approximate tangential plane of the ground or growing medium beneath the canopy in a direction parallel to the planting rows of a wheat plot and the orientation of the phenotyping device when moved is such that the canopy spreader is perpendicular to the direction of the planting rows.

In another embodiment, the height parameter is defined relative to the approximate tangential plane of the approximate top of the canopy in a direction parallel to the planting rows of a barley breeding plot parallel to the approximate tangential plane of the approximate top of the canopy and the orientation of the phenotyping device when moved is such that the canopy spreader is in for example 30 degree angle in relation to the direction of the planting rows. The use-orientation-height specification is crop species and sowing practice specific.

In an example, the use-orientation-height specification is different for barley than for soybean. In an example, the canopy spreader is a shaft. In the example, the use-orientation-height specification specifies that the canopy spreader is to be maintained in a 180+−10 degrees angle in relation to the tangential plane of the approximate top of the canopy, moved in the direction of the tangential plane of the approximate top of the canopy and to be maintained at a height of 20+−5 cm below the approximate top of the target canopy so that the direction of movement of the phenotyping device is parallel to planting rows and the canopy spreader remains perpendicular to the planting rows.

Each of the one or more camera units is oriented and located with respect to the one or more canopy spreaders according to device-specific a device-location-angle specification. The device-location-angle specification specifies the distance and angle of each of the camera units in relation to the canopy spreader, the canopy spreader that will be positioned in relation to the current set of raw data collection targets at an approximately constant distance and orientation in each frame and image of the raw data collected by the one or more camera units, when the phenotyping device is moved according to the use movement specification and the use-orientation-height specification. I.e., the raw data is collected according to the input data specification. In this way the current set of raw data collection targets is positioned in relation to the camera unit according to an input data specification related to each of the one or more camera units, where the input data specification was used to specify the device-location-angle specification. In other words, the raw data recorded by the phenotyping device is recorded according to the input data specification when the phenotyping device is positioned and oriented according to the use-orientation-height specification and optionally moved in the canopy in the direction specified by the use-orientation-height specification at the velocity defined by a use movement specification, each location, angle and velocity parameter being within the tolerance specified in the corresponding specification. The device-location-angle specification varies according to the crop species, sowing or seeding practices such as plot width, the height of the canopy and other mechanical properties of the canopy. The device-location-angle specification of the camera unit specifies the orientation and distance of the camera unit in relation to the canopy spreader, however, when the device is used according to the other specifications, the relation to the canopy spreader also specifies the distance and angle in relation to the current set of raw data collection targets indirectly.

Furthermore, the use-orientation-height specification comprises tolerances for deviations from the orientation and height within which the raw data recorded by the one or more camera units of the phenotyping device fulfils an input data specification. In an example, the use-orientation-height specification specifies that the phenotyping device is moved e.g., at height of 70 cm+/−5 cm above the soil surface, where +/−5 cm is the tolerance. In another example, the use-orientation-height specification specifies that the phenotyping device must be moved at a height of 70%+/−10% of the average height of the plants of the target canopy, where the tolerance is +/−10% of the average height of the plants.

Fulfilling the input data specification ensures that the first machine learning system is able to process the collected raw data into estimates of phenotypic traits. Given the optical parameters of the one or more camera units, the input data specification then also indirectly specifies how far away the one or more camera units should be from the current set of raw data collection targets to provide necessary number of pixels sufficient for the machine learning system. In other words, the input data specification specifies how the current set of raw data collection targets must be recorded in the raw data. The input data specification may be defined in terms of object sizes, angles and positions of objects in the images/video frames of the raw data. Alternatively, the input data specification may be defined in terms of the properties of the one or more camera units and their distances to the current set of raw data collection targets when the phenotyping device is used. E.g., a camera unit with a field of view of 120 degrees must be located so that the distance to the current set of raw data collection targets is e.g., 30-150 cm, 100-140 cm or 50-120 cm during the data collection session. The necessary number of pixels refers e.g., to a spike in one of the plants belonging to the current set of raw data collection targets is identified better, if there are 400 pixels of the spike than if there are 100 pixels. A sufficient resolution for counting the number of seeds in a e.g., barley spike is <0.8 mm/pixel.

The input data specification enables to improve the quality, i.e., the input data specification maximises the use of pixels for collecting raw data from the current set of raw data collection targets and hence maximises the information accumulation and the quality of the trait estimates.

In an example, the parts of plants of interest are the spikes of barley plants. In the example, the sufficient resolution for the part of the image containing a spike for the purpose of estimating the size of the spikes from the raw data is e.g., 50 times 50 pixels in the first machine learning system and a camera unit that is one of the one or more camera units records raw data that will be used to estimate the sizes of the spikes.

In the example, the lengths of the spikes of the plants in the target canopy are greater than 30 mm and the resolution of the camera unit is 3800 times 2000 pixels. In the example, the distance of the camera unit to the spikes of the plants belonging to the current set of raw data collection targets is set so that within the borders of the field of view of the camera unit the dimensions of each pixel measured from the current set of raw data collection targets are less than 0.6 mm times 0.6 mm to obtain >50 times 50 pixels for objects longer or equal to 30 mm as this number of pixels is sufficient to properly estimate the size of the spike. The actual distance parameter between the camera unit and canopy spreader of the device-specific device-location-angle specification depends on properties of the camera and lens such as the field of view of a camera.

In an embodiment, defining the device-specific device-location-angle specification comprises specifying and adjusting the distance and angle of each of the camera units in relation to the one or more canopy spreaders to values of the parameters in which the raw data collected from the current set of raw data collection targets by the one or more camera units fulfils the input data specification when the phenotyping device is moved according to the use-orientation-height specific action and the use movement specification.

When moving the phenotyping device, the target canopy is spreaded with the phenotyping device according to the use-orientation-height specification to reveal a collection targets of the raw data and recording the raw data. The phenotyping device is moved in the target canopy according to the use movement specification during the data collection session so that as the one or more canopy spreaders move, the current set of raw data collection targets changes along with the movement according to the make space—be seen—be covered-dynamics and information is obtained from a wider part of the target canopy. The phenotyping device is moved in the target canopy to record the raw data by a human user, a robotic system or a vehicle, wherein the phenotyping device is mechanically connected to the robotic system or the vehicle via a mechanization unit.

In an example, at a given moment t0 during the data collection session, the current set raw data collection targets comprise of such a set of plants in the target canopy that at the moment t0 during the data collection session, the one or more camera units have visibility to further parts of the plants in the current set raw data collection targets due to spreading the canopy. In other words, the current set of raw data collection targets at time point t0 comprises the plants that are exposed to the one or more camera units at the given moment t0 due to spreading the canopy.

In an embodiment, the current set of raw data collection targets are the plants standing up that were the previous plants to have been released under the canopy spreader. In another embodiment, the current set of raw data collection targets are the plants that are standing up and the plants that are rising up after being released from under the canopy spreader.

It is important to emphasise, that raw data may be obtained for several time points for the current set of raw data collection targets before the current set of raw data collection targets is fully or partially covered by other plants, when the phenotyping device is moved in the canopy.

The raw data comprises of video, still images, tension measurements, height measurements, spectral imaging data, acceleration measurements and any other type of measurements obtained with the one or more camera units, one or more tension sensors, height sensors and the set of other sensors.

The data collection session is a period of time during which the raw data is collected from the target canopy. In an example, the data collection session lasts 10-30 seconds. Optionally, the user uses one of the one or more control units to initiate and end the data collection session.

When the phenotyping device is moved or is moving within the canopy, the current set of raw data collection targets will change along with the movement according to a make space—be seen—be covered-dynamics and the raw data will be obtained with higher coverage of the target canopy. The make space—be seen—be covered-dynamics comprises the following steps iterated repeatedly.

At first at time point t1 the canopy spreader is pushing aside plant individuals in group B to reveal the current set of raw data collection targets at t1 to the one or more camera units, the current set of raw data collection targets at that time point t1 corresponding to the plant individuals belonging to group A. In other words, the canopy spreader is making space for the line of sight to the current set of raw data collection targets from the one or more camera units.

Then at time point t2 the phenotyping device and the connected canopy spreader has moved and pushed aside plant individuals belonging to group C, the plant individuals earlier pushed by the canopy spreader in group B have risen up and are visible to the one or more camera units and have become the raw data collection targets at time point t2 as their parts that would not be visible without spreading the canopy are now seen by the one or more camera units. Now at t2 the plants in group B fully or partially cover the plant individuals in group A and plants in the group A no longer are a part of the current set of raw data collection targets.

In the next step at time point t3 plant individuals in group D are pushed aside by the canopy spreader to make space for observing the individuals in group C that have risen up to be seen and to become the current set of raw data collection targets and plant individuals in group B are covered fully or partially by the individuals of group C.

Optionally, the phenotyping device is moved within the target canopy according to a use movement specification. The use movement specification comprises the velocity of the movement in the direction specified by the use-orientation-height specification. In addition, the use movement specification comprises tolerances for the velocity such that when the velocity of the phenotyping device is within the tolerance and the direction of movement within the direction tolerance specified by the use-orientation-height specification, the raw data recorded is within the tolerances of an input data specification and the raw data is processed into one or more sets of result estimates by one or more machine learning systems, e.g. with a first machine learning system and optionally a second machine learning system and optionally a third machine learning system. The machine learning system is used to process the raw data from one or more data collection sessions into a one or more sets of result estimates. Each of the one or more sets of result estimates corresponds to a set of estimates for one of the phenotypic traits.

In an example, when the velocity is higher than specified in the use movement specification the plants pushed away from covering the current set of raw data collection targets will not have time to rise back to a standing position during the time that they would be in the field of the camera unit and the plants are thus not recorded in the raw data.

In an example, the use movement specification is to move the phenotyping device in the direction specified by the use-orientation-height specification so that the velocity of the phenotyping device is 0.25-0.5 m/s. In the example, at this velocity the plant individuals have time to rise up according to after being pushed aside by the canopy spreader before they become the current set of raw data collection targets according to the make space—be seen—be covered-dynamics and the plant individuals of the current set of raw data collection targets are positioned in the raw data according to the input data specification corresponding to distances of plants in the current set of raw data collection targets to the one or more camera units, such as 120-145 cm from the one or more camera units. Furthermore, the use-orientation-height specification specifies that the canopy spreader should remain at a constant height of 17-23 cm below the top of the canopy, the height of the canopy being estimated by averaging over a distance of 30 cm preceding the location of the current set of raw data collection targets.

In another example, the canopy spreader moves at a constant height of 25 cm below the top of the canopy specified by the use-orientation-height specification. When the canopy spreader moves on the average 4.5 cm forward between time points t1 and t2, the time between t1 and t2 being specified by the velocity defined by the use movement specification, the set of plants in group B making space for the plants seen in group A at time point t1 are released and at time point t2 the plants in group B will fully or partially cover the plants in group A that are seen at t1 by the one or more camera units. The movement velocity is adjusted so that plants have sufficient time to rise up. In experiments, a suitable velocity has been between 0.6 m/s and 0.15 m/s.

Optionally, raw data from several target canopies is recorded during the data collection session and a third machine learning system is used to split the data collection session into several data collection sessions each containing raw data from only one target canopy.

The first machine learning system is used to process the raw data from one or more data collection sessions into a one or more sets of result estimates. Each of the one or more sets of result estimates corresponds to a set of estimates for one of the phenotypic traits.

In an example, the raw data from each of the data collection sessions is processed by the first machine learning system into estimates of the number of spikes in the target canopy. A set of result estimates comprises an estimate of one phenotypic trait or other interesting agronomic trait such as yield and the like relating to each of the target canopies. Examples of phenotypic traits to be estimated for the target canopies comprise the number of spikes, the number of seeds in each spike, biomass of different plants, disease and pest symptom area estimates, estimates of sizes of various plant parts, plant morphology, DUS traits and gene bank characteristics. Further phenotypic traits to be estimated by the first machine learning system to be compiled as a set of result estimates comprise various symptoms related to water and drought stress, symptoms related to nutrient deficiencies and symptoms related to unwanted side effects of herbicides and pesticides. Phenotypic traits to be estimated also comprise the number, size and species of other plants growing in the target canopy such as weeds and plants of the intended species of the target canopy that are of another variety or genotype.

The machine learning system uses deep neural networks or other machine learning models for converting inputs comprising the raw data from each the data collection sessions into output such as estimates for the phenotypic traits. In an embodiment, the machine learning system first processes estimates for individual still images extracted from video in the raw data and then aggregates estimates for the data collection session as a whole. In an example, the data collection session contains raw data from one breeding trial plot. In an embodiment, the machine learning system estimates a spatial distribution of yield components from the raw data collected during the data collection session. In an embodiment, the set of result estimates comprises the output of the machine learning system for each data collection session, that is estimates of interesting agronomic and other traits generated by the machine learning system from the raw data. Optionally, the set of result estimates also comprises raw data related to the data collection session.

Optionally, the method and system also comprises the second machine learning system. The second machine learning system is operated by the one or more computational units and taking as input the one or more sets of result estimates relating to the one or more data collection sessions, to generate one or more sets of result estimates from the outputs of the first machine learning system and to output a second set of result estimates. The second machine learning system takes as input the one or more sets of result estimates generated by the first machine learning system relating to the data collection sessions and outputs a second set of result estimates. The second set of result estimates comprise of spatial error correction maps and other scores that may be computed by aggregating the one or more sets of result estimates from several data collection sessions.

The phenotyping system for measuring phenotypic traits of one or more plants in a target canopy based on imaging-based estimation of phenotypic traits comprises one or more computational units, in which the computation for the first, optionally second and optionally third machine learning systems is performed to process the raw data stored on the storage component. In an embodiment, the computational unit is a cloud server, on which the first, optionally second and optionally third machine learning systems are hosted. In another embodiment the computational unit is attached to the canopy phenotyping device to enable obtaining sets of result estimates in real-time.

Optionally, the first machine learning system takes as input the use-orientation height specification. Optionally, the first machine learning system takes as input one or more of the following: the device-specific device-location-angle specifications, the distances between any components of the phenotyping device when each component has been located and oriented according to the device-location angle specifications. In an example, the first machine learning system takes as input the distance between the one or more camera units and the one or more canopy spreaders. In another example, the first machine learning system takes as input the positions and orientations of the one or more height sensors and the distance of the height sensors to the one or more camera units or the dimensions of such components of the phenotyping device that the distance between the one or more camera units and the canopy spreader can be calculated from the dimensions and the device-specific device-location-angle specifications.

In an embodiment, the first machine learning system is configured to assume in calculations when the first machine learning system is processing the raw data into the one or more sets of result estimates that the raw data recorded by each of the one or more camera units has been recorded according to the input data specification that is camera unit specific. In one example, the input data specification specifies that one or more canopy spreaders are seen in the bottom (lowest 35 pixels) of the image and the canopy spreaders are aligned with the horizontal direction of the image and the input data specification specifies that spikes to be observed must be >40 pixels long. In another example, the input data specification comprises angular and distance parameters and their tolerances of the one or more camera units in relation to the current set of raw data collection targets and the camera parameters of the one or more camera units that together define the size of objects in the current set of raw data collection targets in the raw data collected by the one or more camera units. In another embodiment, the first machine learning system estimates the angle and the distance of the one or more camera units to the canopy spreader from the raw data by taking as input the know physical size of objects seen in the images (such as the canopy spreader) and inversely estimating the distance from the lense from the observed size in pixels and the known size and the camera parameters.

When the raw data has been recorded according to the input data specification, the parts of the plants in the images or video of the current set of raw data collection targets that are of interest for estimation of phenotypic traits related to the parts of the plants are recorded at a sufficient resolution and all plants belonging to the current set of raw data collection targets are within the field of view of the particular camera unit that is responsible for obtaining images or video of the parts of the plants that are of interest so that the first machine learning system can estimate the required target phenotypic traits for the current set of raw data collection targets.

In an example, the target canopy is a wheat breeding trial plot with width 120 cm and canopy spreader is a straight shaft of length 140 cm and the phenotyping device comprises one camera unit. When the phenotyping device is moved, the canopy spreader moves parallel to the approximate surface of the ground and orthogonal to the planting rows and is oriented pointing partly towards the ground and towards the middle line of the trial plot comprising of the points equally distant from the borders of the plot in the direction of the width, where the angle of the camera unit is measured from a line pointing from the centre of the lens of the camera unit to the centre of the image.

In an embodiment, the width of a breeding plot is 120 cm but the current set of raw data collection targets only comprises the plants that are situated at a 30 cm interval whose middle point is in the middle of the width direction of the breeding plots. In the embodiment the camera unit may be positioned closer to the canopy spreader than if the current set of raw data collection targets comprises plants from the full width of 120 cm.

In an example, the input data specification for the raw data collected by a camera unit A, which camera unit is one of the one or more camera units, is that the angle between a straight line from the centre of the lens of a camera unit A to the centre of the field of view of the camera unit A and an approximate soil surface normal, is 26-45 degrees and that the spikes of the plants must be contained at an approximate level of the image center in terms of the height dimension of the image. Each of the one or more camera units has a device-specific input data specification. To further clarify, the images of the plant parts corresponding to the traits estimated from the video and image data must be visible and large enough in terms of pixels, which defines a maximal distance from the used camera unit to parts of the plants corresponding to the traits of the current set of raw data collection targets. The mechanical properties of the plants in the target canopy define how deep the canopy spreader can spread the plants in the target canopy. The depth of spreading defines the angle, at which the one or more camera units may obtain image or video from the parts of the plants of the current set of raw data collection targets. The projection angle of the recorded image and video is the summed effect of the use-orientation-height specification, the device-location-angle specification and any fluctuation, disorientation and shaking that occurs while using the phenotyping device and the projection angle must remain within the tolerance specified by the input data specification for the raw data to be processed properly by the first machine learning system. Properly means in this context that the parts of the plants in the video or images recorded by the camera unit are located within the regions of the image where the first machine learning systems assumes them to be. In other words, when the phenotyping device is used so that the resulting angles and distances are within the tolerances of the input data specification, the trait estimates are more accurate and can be guaranteed to pertain certain levels of accuracy, such as measured by a Pearson correlation of >0.85 between estimates and a manually measured ground truth. When the angles and distances are not within the tolerances, the first machine learning system may not be able to process the raw data at all or the results will be poor. In another example, the machine learning system processes the raw data into estimates of spike lengths but device-location-angle specification is poorly adjusted and the spikes are not visible in the raw data collected. Then the first machine learning system is not capable of processing the raw data into estimates of spike lengths. Whereas the input data specification for the raw data is defined in relation to the current set of raw data collection targets, the angle of the camera unit specified in the device-location-angle specification is defined and adjusted in relation to the canopy spreader as when the phenotyping device is moved according to the use-orientation-height specification and the use movement specification, the distance and angle of the current set of raw data collection targets will be fixed in relation to the canopy spreader.

Optionally, the device-specific device-location-angle specifications are sought through experimentation. In an example, the phenotyping device is used to record raw data for breeding plots of width 120 cm and the canopy spreader is a shaft of 140 cm and according to the use height specification the canopy spreader is moved in a direction orthogonal to plot width in an orientation parallel to plot width dimension at a height of 20 cm below the approximate top of the canopy along the direction of the approximate canopy surface. The user first adjusts the distance of one camera unit to the centre of the canopy spreader so that the plants that become visible while spreading the canopy from full plot width become visible, these plants being the current set of raw data collection targets. The user then tests various moving velocities ranging from 0.1 m/s to 0.7 m/s and for each velocity adjusts the location and angle of the camera unit relative to the canopy spreader so that when holding the device according to the use-orientation-height specification and moving according to the use movement specification the camera unit records raw data so that parts of relevance for the phenotypic traits estimated by the first machine learning system of the plants of the current set of raw data collection targets are contained in the images or video recorded by the camera unit. In an embodiment, when adjusting the angle of the device-location-angle specification, the camera is oriented so that the canopy spreader is in the lower border of the camera image to maximise the area of the current set of raw data collection targets in the image or video obtained by the camera unit.

Optionally, the user searches for the height parameter value of the use-orientation-height specification through experimentation. An optimal value is such that the canopy is spreaded as much as possible while not damaging the plants to open a line of sight to the one or more camera units to the plants of the current set of raw data collection targets so that the projection from the camera to the current set of raw data collection targets is as orthogonal as possible. To clarify, the plants typically grow in the direction of the normal of the approximate surface of the ground and the angle between a straight line from the lens to the centre of the image should be as perpendicular as possible in relation to the growing direction corresponding to the normal of the surface of the ground.

To emphasise, the height parameter of the use-orientation-height specification and the parameters of the device-specific device-location-angle specifications may be sought by experimentation, the objective of the experimentation being to find the values of the parameters that maximise the average number of pixels for the parts of the plants of relevance for the estimated phenotypic traits for the plants in the current set of raw data collection targets in the parts of the image of each of the camera unit's view where the parts of the plants of the current set of raw data collection targets are located and assumed to be by the first machine learning system. Once the user finds the values of the parameters that provide sufficient resolution for the parts of the plants he wants to study, the values of the parameters are used to specify the use-orientation-height specification and the device-specific device-location-angle specification.

The input data specification is a function of the needs of the first machine learning system for input data and the dimensions and other properties of the target canopy. The use movement specification is a function of the properties of the target canopy where the target canopy in practice sets the limits to velocity of movement when collecting raw data, the use movement specification comprising the range of feasible velocities. The device is moved at a height and orientation specified by the use-height-orientation. The device-location-angle specification specifies the location and angle of the camera unit with respect to the canopy spreader so that taking into account the use-height-orientation and the use movement orientation, the raw data collected by the camera unit will be collected so that the input data specification is fulfilled. The angle and distance between the camera unit and the canopy spreader is controlled by adjusting one or more parameters of the means for controlling the angle and the distance of the camera unit in relation to the canopy spreader that control the angle and the location.

In an embodiment, the device-specific device-location-angle specifications are not changed during the data collection session. In another embodiment, the device-specific device-location-angle specifications are modified during the data collection session and the varying values of the device-specific device-location-angle specifications are stored on the storage unit.

In another example the user wants to estimate disease traits symptoms located very close to the ground and is not interested in the top parts of the canopy. In such a case the camera is located closer to the current set of raw data collection targets and the top parts of the plants may be partly missed in the raw data, however, providing a higher pixel resolution for the disease symptoms.

When moving the phenotyping device in the canopy, the shutter speed of the one or more camera units aiming at high resolutions should be less than 1/3000 s, the typical values ranging between 1/4000 s and 1/8000 s. The ISO sensitivity and the aperture are set to provide high sensitivity. If the parts of the plants of interest are located close to the ground, less light is available and a higher sensitivity (or longer shutter speeds) are needed to obtain high resolution data.

In another example, the quality of the image is optimal for the parts of the plants close to the top of the canopy when the shutter speed is 1/8000 s. In the example the optimal shutter speed for recording data from the bottom of the canopy is 1/4000 s from the same camera unit position.

In an embodiment, several camera units are used simultaneously and device-specific device-location-angle parameters and imaging parameters (shutter speed, ISO sensitivity) are selected so that the different camera units obtain images and video from different parts of the plants in the current set of raw data collection targets.

In an embodiment, the phenotyping device is used to collect data for a plant breeding program. A trial station has 500 trial plots (sized 10 m*1.2 m) and each trial plot corresponds to a target canopy. The phenotyping device is moved in the target canopy. The user initiates the data collection session in one end of a trial plot by using the electronic control unit, moves to the other end of the trial plot while collecting raw data and ends the data collection session in the other end of the trial plot again by using the electronic control unit. During the data collection session, the canopy spreader makes a new set of raw data collection targets visible to the camera unit by spreading the canopy so that all above ground parts of the plants belonging to the current set of raw data collection targets at each moment can be seen completely aside from occasional occlusion with other plants. As the user is moving, the raw data collection targets change continuously and raw data is acquired for all or almost all of the plant individuals in the target canopy. The raw data is stored to the storage component so that during the data collection session, the raw data is written on a temporary storage that is an external hard drive in this embodiment. The user initiates a separate data collection session for each trial plot. When the phenotyping device is brought to the location with network connection (wireless or cable connected), the phenotyping device is connected to a server storage component via the communication means (e.g., Internet) and the raw data is transferred from the temporary storage to the server storage component. Once the raw data is stored at the server storage component, the first machine learning system takes as input the raw data from the different data collection sessions and outputs for each data collection sessions (corresponding to the trial plots) estimates for the total count of spikes, count of seeds in each spike, the total area of disease symptoms, total biomass and estimates for several DUS traits. In addition to the trait estimates obtained by averaging or summing over the data collection session, the first machine learning system also outputs a spatial map of yield components for each of the trial plots recorded during the data collection sessions. Furthermore, the first machine learning system computes yield measurement correction factors for each data collection session corresponding to a trial plot by taking as input the spatial map of yield components and outputting a correction factor to remove the effect of heterogeneity in the trial plot.

The outputs of the first machine learning system are given as input to the second machine learning system that gives as output the second set of result estimates comprising further spatial error correction factors for making yield measurements from the different trial plots corresponding to data collection sessions further more comparable by taking into account lesser spatial variation in the field that cannot be seen by looking only into individual plots and requires aggregating information from various trial plots simultaneously. The user is provided the first set of result estimates and the second set of result estimates.

In an embodiment, the means for controlling the angle and the distance of the camera unit in relation to the canopy spreader comprises a frame comprising camera position maintenance unit with which the distance and the angle between the camera unit and the canopy spreader can be fixed to parameters according to the device-specific device-location-angle specification.

In another aspect, an embodiment of the present disclosure provides a phenotyping system for measuring phenotypic traits of one or more plants in a target canopy comprising at least one phenotyping device according to present disclosure; a means for moving the phenotyping device; and a means for processing the data produced by a phenotyping method comprising one or more computational units.

In an embodiment, the phenotyping system for measuring phenotypic traits of one or more plants in a target canopy may further comprise one or more computational units hosting one or more machine learning systems to operate a first machine learning system configured to process data from the current set of raw data collection collected by one or more camera units of the one or more phenotyping device in the storage unit into a one or more sets of result estimates.

DETAILED DESCRIPTION OF THE DRAWINGS

Referring to figure FIG. 1 there is shown a top view of a phenotyping device according to an embodiment of the present disclosure, wherein the phenotyping device comprises a canopy spreader 110 comprising two height sensors 120, a frame 130, a tension sensor 140 connecting the canopy spreader 110 to the frame 130 to measure the mechanical resistance due to spreading the canopy, a camera unit 150, a camera position maintenance unit 160 connecting the camera unit 150 to the frame 130.

Figure 2:
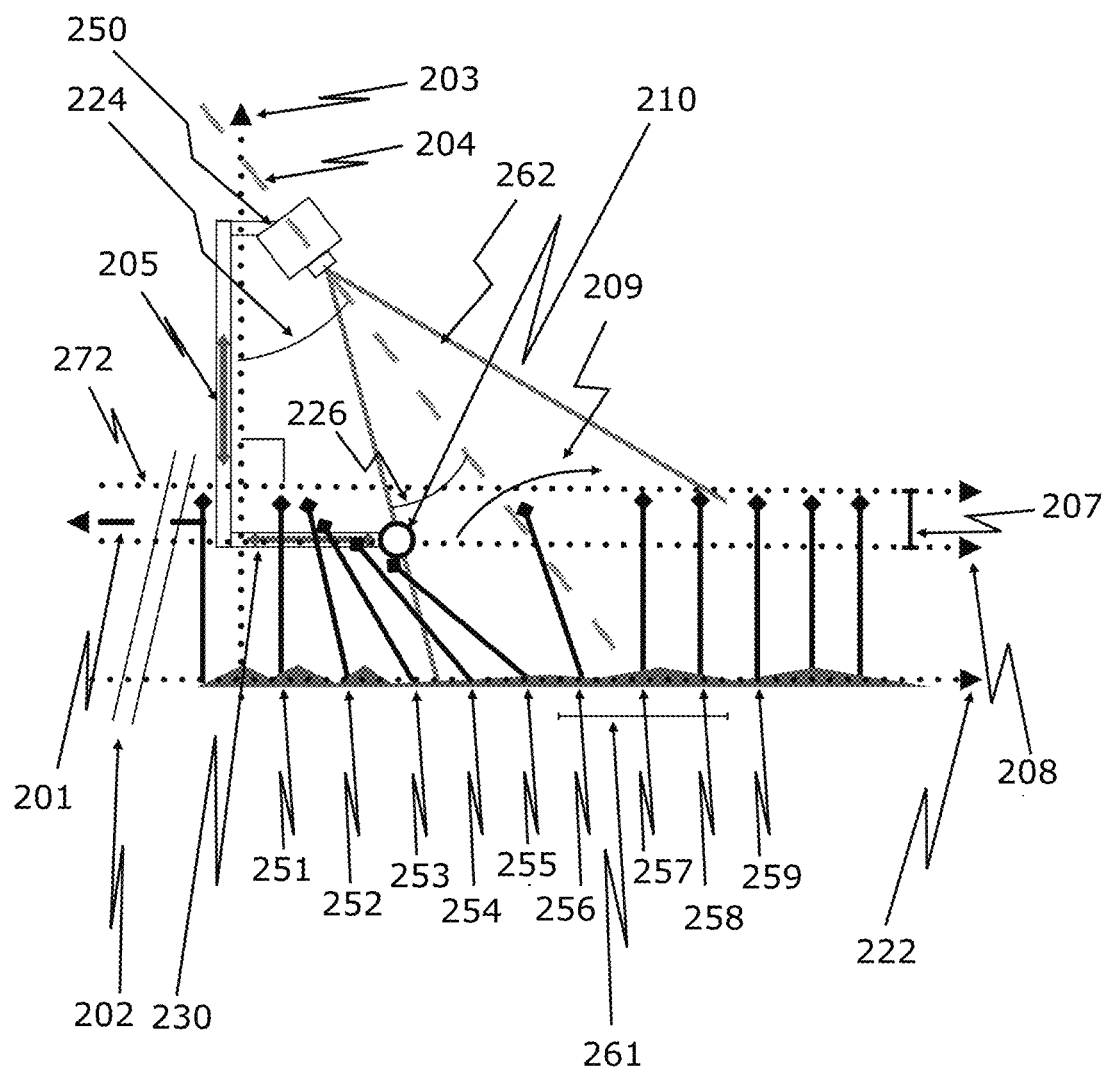
FIG. 2 is a schematic side view of a phenotyping device according to an embodiment illustrating the position of the device in the canopy in relation to one particular plant at different timepoints.

Referring to figure FIG. 2, there is shown a schematic illustration of a phenotyping device according to an embodiment of the present disclosure, wherein the position of the phenotyping device in the canopy from the side in relation to one particular plant at different timepoints is shown. The phenotyping device comprising a camera unit 250, a canopy spreader 210 and a frame having a first telescopic structure for vertical distance adjustment 230 and a second telescopic structure for horizontal distance adjustment 205, is moved in the direction 201 according to the use-height-orientation specification with respect to the approximate direction of the tangent of the ground under the target canopy 222, wherein the direction of the movement of the phenotyping device 201, the approximate direction of the tangential surface of the ground under the target canopy 222 and the direction of the tangential surface of the approximate top of the canopy 272 are parallel 202.

The first telescopic structure 230 enables adjusting the distance of the camera unit 250 from the current set of raw data collection targets. The second telescopic structure 205 for horizontal distance adjustment in the frame can be used to modify the distance between the camera unit 250 and the canopy spreader 210 in the horizontal direction. Adjusting the vertical and horizontal distances of the camera unit to the canopy spreader 210 also adjusts the vertical and horizontal distances of the camera unit to the current set of raw data collection targets and the angle between the camera unit and the frame, a distance and orientation specified in the input data specification can be achieved. In the example, the full area captured in the field of view 262 of the camera unit 250 demonstrates the distances and angles with respect to the phenotyping device at which the selected plant may be recorded in the raw data.

When the phenotyping device is moved to the direction 201 according to the use-height-orientation specification then the canopy is pushed down and when the plants of the canopy are released from under the canopy spreader 210 the top parts of the plants of the canopy moves according to the trajectory 209, wherein the distance from the approximate top of the canopy to the height of the canopy at which the phenotyping device pushes down the canopy is distance 207. When the phenotyping device is moved in the direction 201 according to the use-orientation-height specification, the canopy spreader will move at constant height in a direction parallel to the plane 208 that is oriented parallel to the approximate tangential surface of the ground under the target canopy 222.

The location of a selected plant in the target canopy in relation to the phenotyping device at timepoints t0 to t10 as the phenotyping device is moved in the direction 201 specified by the use-height-specification according to the velocity specified in the use movement specification during a time interval containing timepoints t0 to t8 is shown is positions 251, 252, 253, 254, 255, 256, 257, 258, 259, wherein at position 251 the selected plant is yet not affected by the canopy spreader or plants dislocated due to other plants affected by the canopy spreader and at positions 252, 253, 254 the selected plant is tilted towards the ground as other plants affected by the canopy spreader push the selected plant towards the ground.

At the position 255 the selected plant will be released from under the canopy spreader when the device moves approximately 1 cm in the direction specified by the use-movement specification. At the position 256 the selected plant has been released from under the canopy spreader and it is rising back on the approximate trajectory 209 to its normal standing position but not standing fully straight yet. At the positions 257, 258 the selected plant has risen fully back to its normal standing position and is still a part of the current set of raw data collection targets.

At the position 259 the selected plant has risen fully back to its normal standing position but no longer a part of the current set of raw data collection targets because the line of sight to the camera unit 250 is blocked by other plants of the current set of raw data collection targets.

The vertical distance with respect to the phenotyping device at which the selected plant is a part of the current set of raw data collection targets is shown as a distance 261.

The angle 224 between the canopy spreader 210 and the camera unit 250 is defined as the angle between the canopy spreader 210 and the line 204 formed from the center of the lense of the camera unit to the center of the image is adjusted according to the device-location-angle specification.

In an embodiment, the line 204 can be used in the input data specification to define how the camera unit should be positioned and oriented with respect to the current set of raw data collection targets. The normal 203 is the normal of the approximate surface of the ground under the target canopy. Optionally, the angle 224 between the normal 203 and the line 204 can be used in the input data specification. Optionally, the device-location-angle specification specifies that the canopy spreader is contained in the field of view 262 of the camera unit 250 at the lowest 50 pixels of the image.

Figure 3:
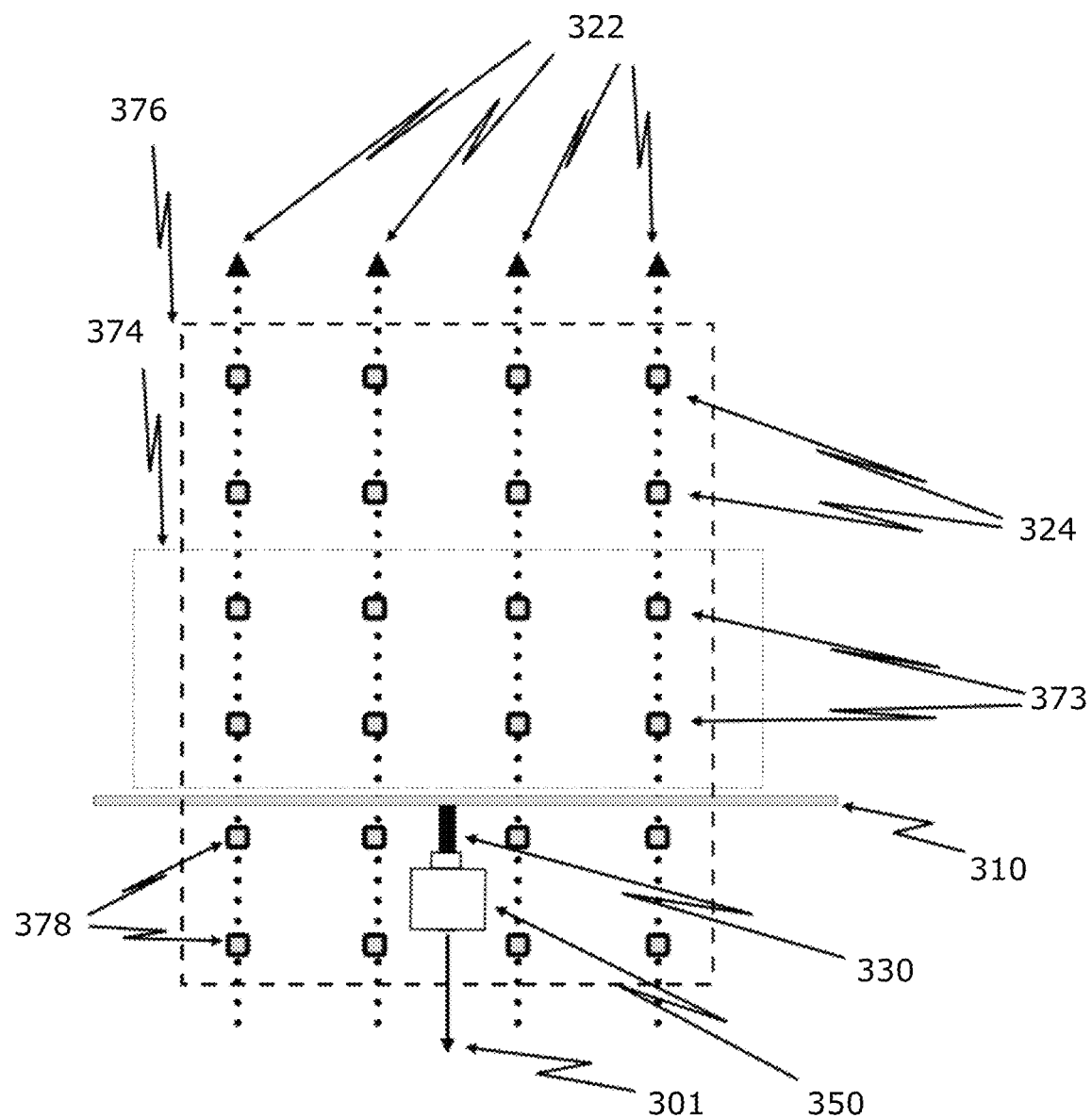
FIG. 3 is a schematic top view of a phenotyping device according to an embodiment illustrating an example of the orientation of the device in the canopy.

Figure FIG. 3 illustrates the orientation of the phenotyping device in the canopy from top view in an embodiment measuring the phenotypic traits of the plants in a target canopy having an area 376, in which the plants of the target canopy in the area 374 are the current set of raw data collection targets at the time of the illustration, when the device is moving in the direction 301 parallel to the direction of the planting rows 322. The phenotyping device is moved to the direction 301 according to the use-orientation-height specification and in the direction that is perpendicular to the direction of the planting rows. The two plants in the rightmost line 324 are not a part of the current set of raw data collection targets, two plants in the rightmost line 373 are a part of the current set of raw data collection targets. At the moment illustrated in figure FIG. 3, the plants in the subarea 374 of the target canopy 376 are the current set of raw data collection targets. Two plants 378 in the leftmost planting row are not yet affected by the canopy spreader 310 but the plants 378 will be affected by the canopy spreader as the canopy spreader moves forward and the plants 378 will after further movement in the direction 301 specified by the use-height orientation specification become a part of the current set of raw data collection targets.

The phenotyping device comprises a frame 330 connecting the canopy spreader 310 to the camera position maintenance unit that is further connected to a camera unit 350. From the top view, the camera unit 350 is oriented in the direction of the planting rows and perpendicular to the canopy spreader 310. The obtained image comprises the area 374 comprising the current set of raw data collection targets.

Figure 4:
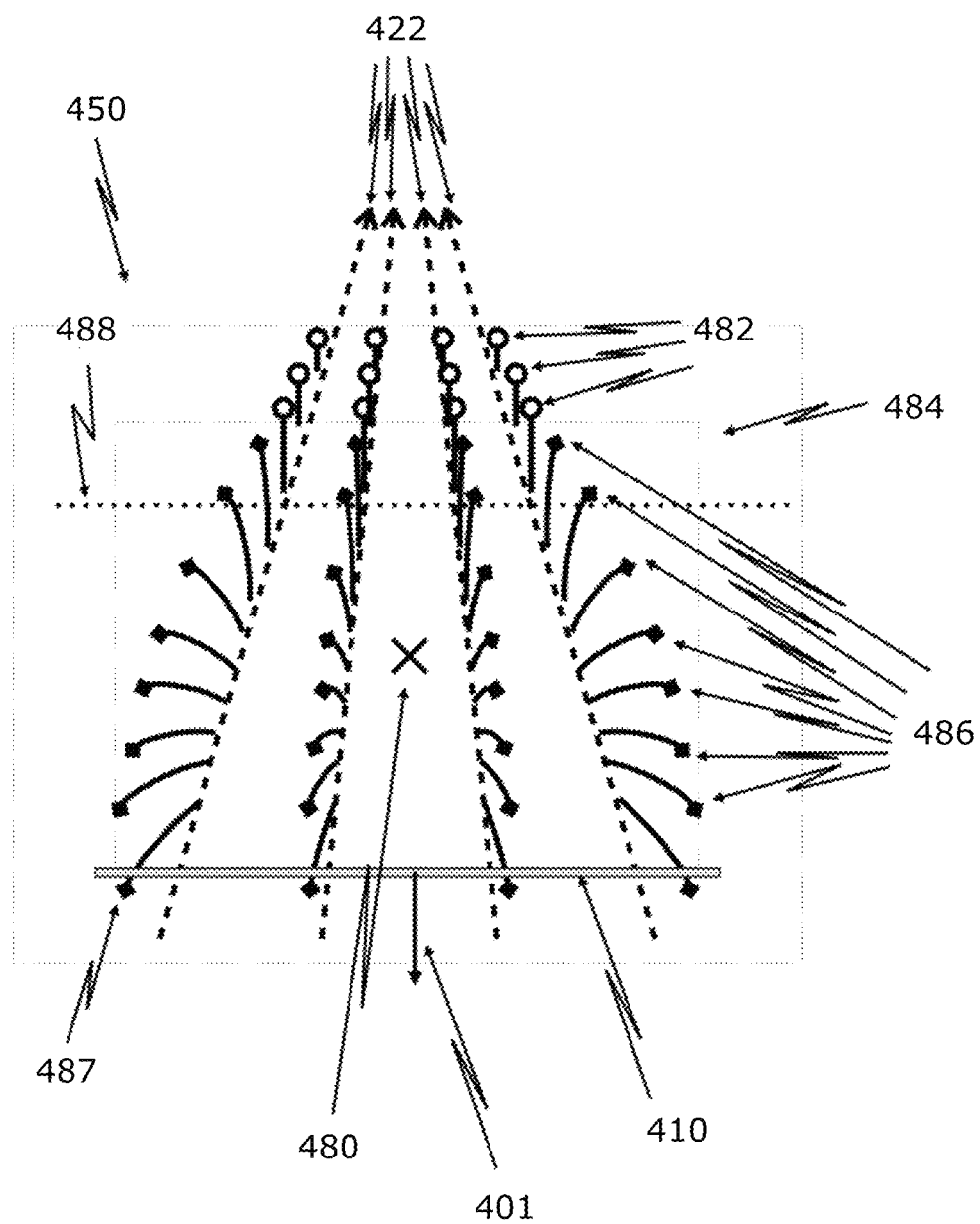
FIG. 4 is a schematic illustration of an example of the image from the target canopy obtained by a camera unit of the device according to an embodiment.

Figure FIG. 4 shows an example illustration of the images obtained by the camera unit from the target canopy, the image having center 480. In the target canopy, planting rows have been sown in directions 442, wherein the phenotyping device is moved in the direction 401 (i.e., parallel to the planting rows) according to the use-height-orientation specification. The three plants 482 in the rightmost row are in the field of view of the camera unit 450 but not a part of the current set of raw data collection targets 484. The plants 486 in the rightmost row are a part of the current set of raw data collection targets 484, plant 487 in the leftmost row of the target canopy that is at the moment of taking the image under the canopy spreader 410 while the canopy spreader is pushing plant 487 aside to make space for the line of sight from the camera unit to the current set of raw data collection targets. The plants behind the illustrative line 488 perpendicular to the planting rows are not a part of the current set of raw data collection targets.

Figure 5:
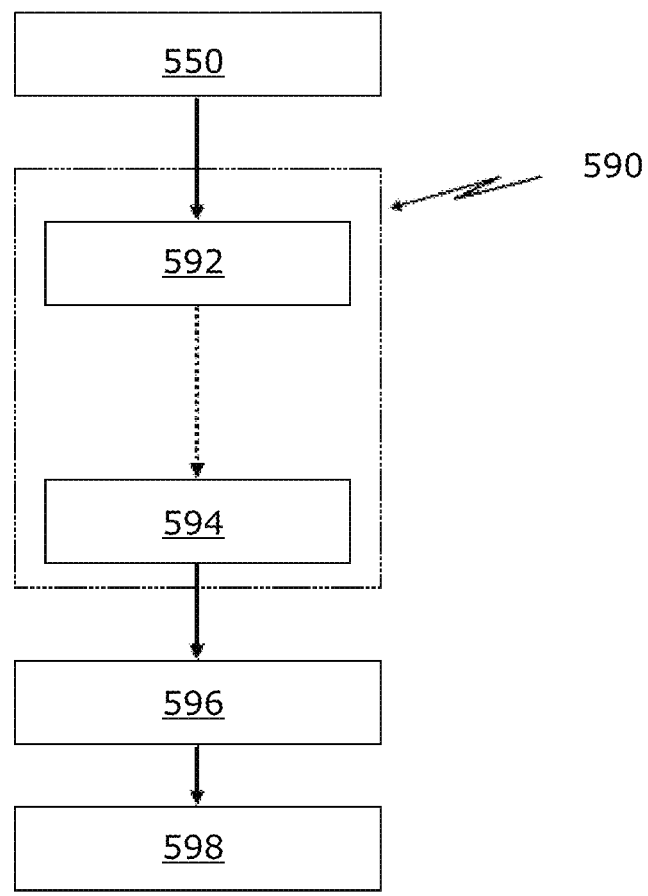
FIG. 5 illustrates the storage and flow of raw data in an embodiment.

Figure FIG. 5 illustrates the storage and flow of raw data in an embodiment, wherein a raw data is recorded by the camera unit 550 and optionally other sensors. The raw data is stored in the storage unit 590 and processed in the computational unit 596 by a first machine learning system. The machine learning system operated on the computational unit 596 outputs the one or more sets of result estimates 598.

The storage unit comprises the temporary storage 592 and the server storage component 594. When the phenotyping device is operated in field conditions, the raw data is stored to an external hard drive. When the user returns to a more urban environment with a fast internet connection, the data is transferred from the temporary storage over the internet to the server storage component.

Figure 6:
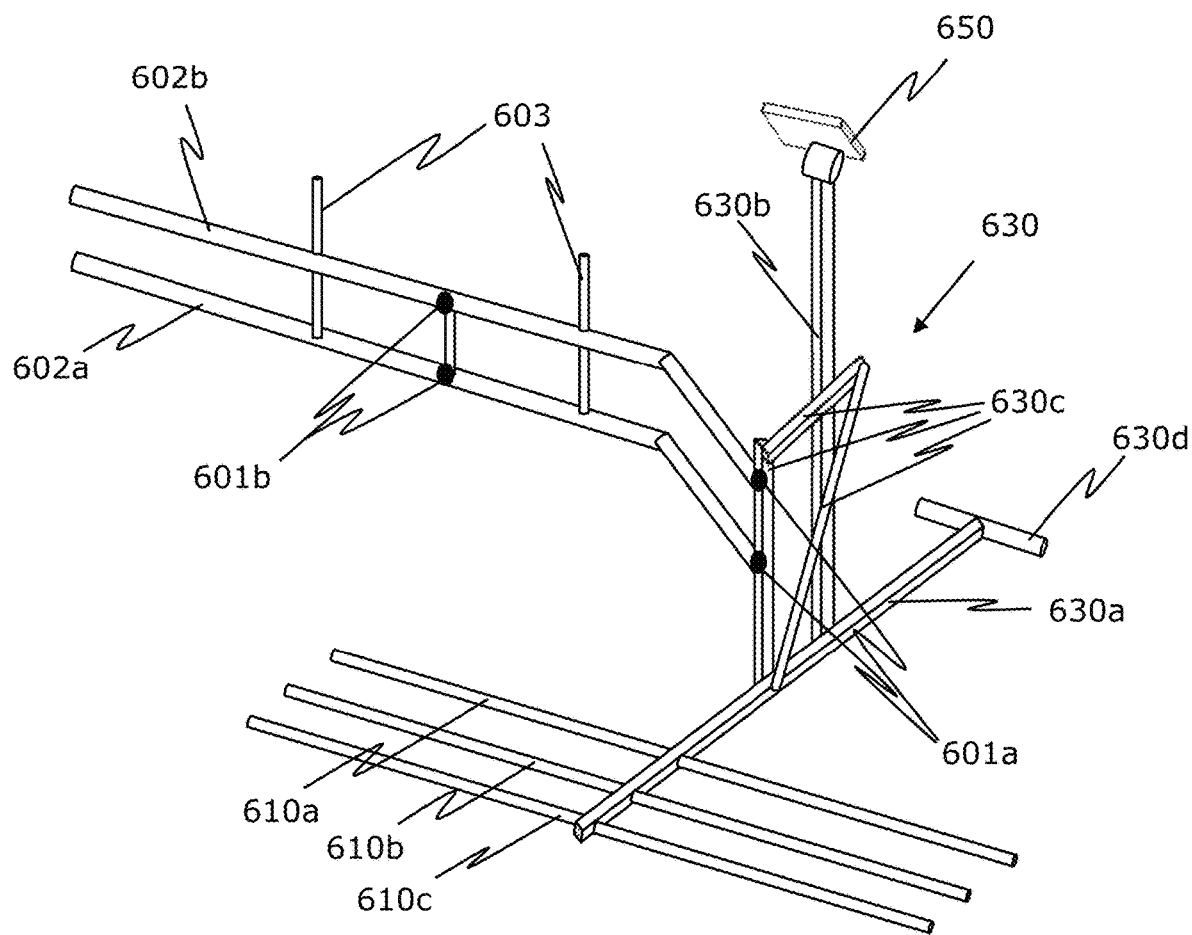
FIG. 6 illustrates an example embodiment of a phenotyping device according to the present disclosure.

Figure FIG. 6 illustrates an example embodiment of a phenotyping device according to the present disclosure. In the embodiment the phenotyping device comprises a frame 630 having a first canopy spreader 610a, a second canopy spreader 610b, a third canopy spreader 610c attached to the frame 630. The phenotyping device further comprises a camera unit 650. A mechanical support structure comprising two bent shafts 602a, 602b and handles 603 is connected to the frame with a first double axis connection 601a. The mechanical support structure is also connected to a person carrying the device with a second double axis connection 601b. The frame 630 in the present example comprises a canopy spreader holding shaft 630a, a camera unit holding shaft 630b connected perpendicular to the canopy spreader holding shaft, a plurality of connecting rods 630c for connecting the shafts 602a, 602b of the mechanical support structure canopy spreader holding shaft 630a and camera unit holding shaft 630b, and a canopy spreaders counterweight 630d. The canopy spreaders 610a, 610b, 610c are attached to the canopy spreader holding shaft 630a parallel to each other 20 cm apart from each other.

The invention claimed is:

1. A phenotyping device for measuring phenotypic traits of one or more plants in a target canopy comprises:
   one or more shafts arranged, when the phenotyping device is moved, to move parallel to a surface of a ground and partly in contact with the target canopy for revealing the one or more plants for imaging in the target canopy;
   one or more camera units;
   a means for controlling the angle and the distance of the one or more camera units in relation to the one or more shafts arranged to maintain the position and orientation of the one or more camera units fixed relative to the shaft;
   an electronic control unit for controlling the camera unit, the electronic control unit being further configured to:
   defining an input data specification for a raw data collected by the one or more camera units of the phenotyping device from a current set of raw data collection targets;
   defining a use-orientation-height specification;
   defining a device-specific device-location-angle specification;
   defining a use movement specification;
   adjusting at least one parameter of the means for controlling an angle and a distance of the one or more camera units in relation to the one or more shafts according to the device-specific device-location-angle specification for maintaining the position and orientation of the one or more camera units fixed relative to the shaft;
   initiating the raw data collection session;
   moving the one or more shafts of the phenotyping device partly in contact with the one or more plants in the target canopy according to the defined use-orientation-height specification and according to the use movement specification for revealing the one or more plants for imaging in measuring phenotypic traits of the one or more plants;

recording the raw data of the one or more plants in the target canopy while moving the device in contact with the target canopy according to the use-orientation-height specification and according to the defined use movement specification;

processing the recorded raw data to estimate the phenotypic traits of the one or more plants in the target canopy.

2. The device according to claim 1, wherein means for controlling the angle and the distance of the one or more camera units comprises an adjustable frame comprising a camera position maintenance unit and the one or more shafts is attached to the adjustable frame by an adjustable connector.

3. The device according to claim 2, wherein the adjustable frame further comprises two telescopic adjustable structures.

4. The device according to claim 1, wherein a camera unit of the one or more camera units comprises at least one of one or more cameras, one or more spectral sensors, a laser scanner or a Lidar sensors.

5. The device according to claim 1, wherein the device further comprises at least one of: one or more tension sensors or one or more height sensors.

6. The device according to claim 2, wherein the device further comprises one or more mechanical support structures attached to the adjustable frame or attached to the one or more shafts.

7. The device according to claim 1, wherein the device further comprises a mechanisation unit connected to the one or more shafts, or to the means for controlling the angle and the distance of the one or more camera units or to the mechanical support structure.

8. The device according to claim 7, wherein the mechanisation unit comprises a motorised height controller and one or more sensors for estimating the height of the canopy.

9. A phenotyping system for measuring phenotypic traits of one or more plants in a target canopy comprising:
at least one phenotyping device according to claim 1;
a means for moving the phenotyping device; and
a means for processing the data produced by a phenotyping method comprising one or more computational units.

10. The system according to claim 9, wherein the one or more computational units hosting one or more machine learning systems configured to process data from the current set of raw data collection targets collected by one or more camera units of the one or more phenotyping device into one or more sets of result estimates.

11. A phenotyping method for measuring phenotypic traits of one or more plants in a target canopy, the method comprising:
defining an input data specification for a raw data collected by one or more camera units of a phenotyping device from a current set of raw data collection targets;
defining a use-orientation-height specification;
defining a device-specific device-location-angle specification;
defining a use movement specification;
adjusting at least one parameter of a means for controlling an angle and a distance of the one or more camera units in relation to a one or more shafts according to the device-specific device-location-angle specification for maintaining the position and orientation of the one or more camera units fixed relative to the shaft;
initiating the raw data collection session;
moving the one or more shafts of the phenotyping device partly in contact with the one or more plants in the target canopy according to the defined use-orientation-height specification and according to the use movement specification for revealing the one or more plants for imaging in measuring phenotypic traits of the one or more plants;
recording the raw data of the one or more plants in the target canopy while moving the device in contact with the target canopy according to the use-orientation-height specification and according to the defined use movement specification;
processing the recorded raw data to estimate the phenotypic traits of the one or more plants in the target canopy.

12. The method according to claim 11, wherein defining the input data specification comprises defining angular and distance parameters of the one or more camera units and their tolerances of the one or more camera units in relation to the current set of raw data collection targets.

13. The method according to claim 11, wherein defining the use-orientation-height specification comprises defining tolerances for deviations from the orientation and height within which the raw data recorded by the one or more camera units of the phenotyping device fulfils the input data specification.

14. The method according to claim 11, wherein defining the device-specific device-location-angle specification comprises specifying and adjusting the distance and angle of each of the camera units in relation to the one or more shafts to values of the parameters in which current set of raw data collection targets are positioned in relation to the one or more camera units according to the input data specification of the cameras when the phenotyping device is moved according to the use-orientation-height specific action and the use movement specification.

15. The method according to claim 11, wherein the use movement specification comprises a velocity of the movement in the direction specified by the use-orientation-height specification and tolerances for the velocity such that when the velocity of the phenotyping device is within the tolerance and the direction of movement within the direction tolerance specified by the use-orientation-height specification, the raw data recorded is within the tolerances of an input data specification and the raw data is processed into one or more sets of result estimates by one or more machine learning systems.

16. The method according to claim 11, wherein the method further comprises defining the orientation and height with respect to the canopy, at which orientation and height the phenotyping device is used and the direction of movement with respect to the canopy.

* * * * *